April 7, 1925.  
H. RAYNES  
1,532,514  
PLUNGER BASIN FOR GLASS FEEDING BOOTS  
Filed April 16, 1923

INVENTOR.  
HARRY RAYNES.  
BY Dewey, Strong,
Townsend and Loftus.  
ATTORNEYS.

Patented Apr. 7, 1925.

1,532,514

UNITED STATES PATENT OFFICE.

HARRY RAYNES, OF SAN FRANCISCO, CALIFORNIA, ASSIGNOR TO ILLINOIS-PACIFIC GLASS COMPANY, OF SAN FRANCISCO, CALIFORNIA, A CORPORATION OF CALIFORNIA.

PLUNGER BASIN FOR GLASS-FEEDING BOOTS.

Application filed April 16, 1923. Serial No. 632,365.

*To all whom it may concern:*

Be it known that I, HARRY RAYNES, a citizen of the United States, residing at the city and county of San Francisco, and State of California, have invented new and useful Improvements in Plunger Basins for Glass-Feeding Boots, of which the following is a specification.

This invention relates to plunger basins for glass feeding boots, and has for its object to provide a basin which will act as a separate chamber or container for a small body of glass to be acted upon by a plunger, thus avoiding the necessity for the plunger operating on the large body of glass contained in the boot.

Molten glass in a small body prior to being discharged through the orifice is better adapted to permit retraction of the suspended glass from the shears on the upward stroke of the plunger. Also a plunger basin of the kind contemplated makes it possible to deliver a hotter gather with minimum chances of defects, such as blisters, occurring in the ware.

The present invention includes means for readily and easily removing the bushing or lining surrounding the orifice so as to permit of substitution or replacement.

In the accompanying drawing—

Figure 1:
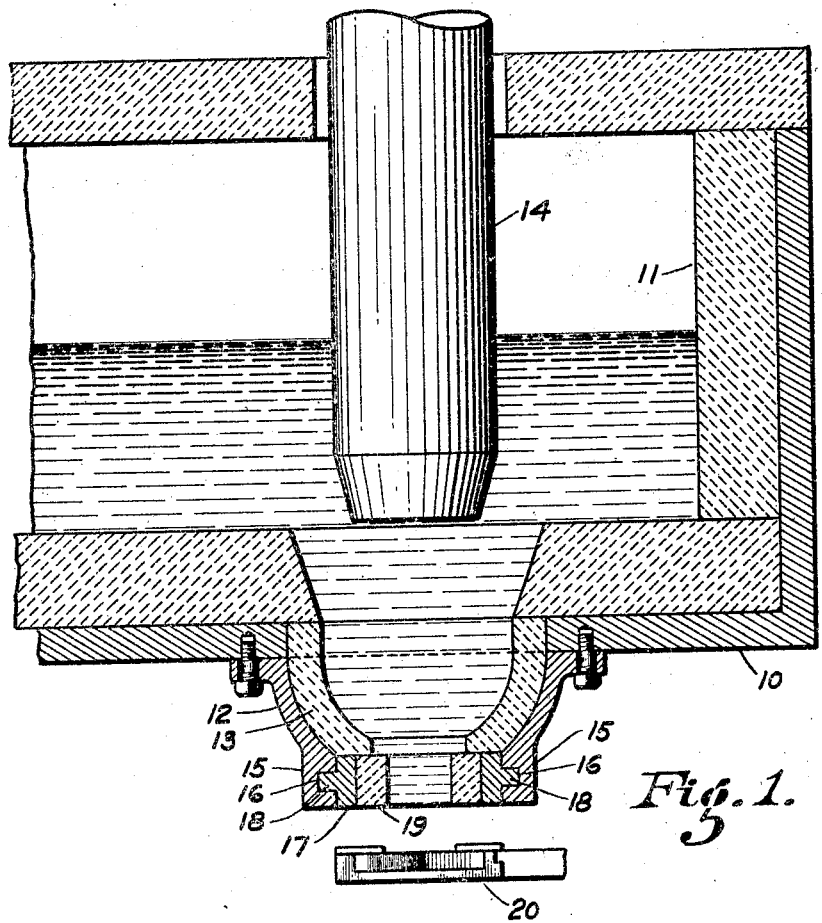
Fig. 1 shows a vertical central sectional view of a glass feeding boot having a basin embodying my invention.
Figure 2:
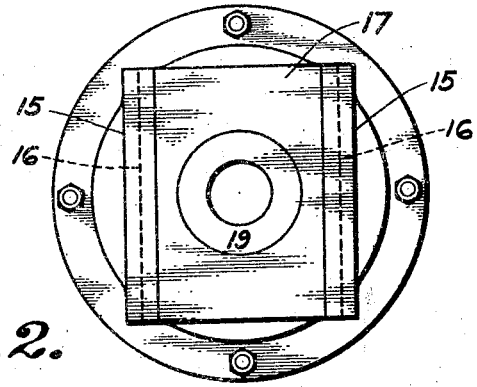
Fig. 2 shows a plan view of the basin.

The device herein illustrated comprises the usual cast iron boot 10 with a clay lining 11. In the bottom of this boot is a discharge orifice surrounding which is a hemispherical basin 12 secured to the bottom of the boot and porvided with a clay lining 13, which lining extends up into the boot and forms a glass-tight fit with the lining 11. Co-operating with the space or chamber formed by the basin is a reciprocating plunger 14 operating intermittently in any preferred manner.

The bottom of the basin 12 has a rectangular opening, at each side of which are flanges 15 provided on their inner faces with grooves 16. A rectangular frame 17 is slidably fitted between the flanges 15 and is held in place by tongues 18 entering the grooves 16. This rectangular frame is provided with a circular opening which receives a bushing or lining 19. The bushing is held in place in the frame by a tapering fit. Below the circular opening formed by the bushing 19 is arranged the usual shears or severing device 20.

The basin herein described forms a chamber or container separate from the boot and in which the plunger operates. Molten glass can therefore be controlled to better advantage in that the plunger has a smaller body to work on and the suspended glass can be more readily retracted from the shears or severing device upon the upward stroke of the plunger. Also, the rectangular frame slidably fitted on to the bottom of the basin affords ready means for changing the orifice bushing 19. This is done by tapping the rectangular frame so as to slide it to one side where the bushing will be out of register with the opening in the bottom of the lining of the basin, whereupon a new frame carrying its own bushing can be put in place at one side of the basin, and as it moves into register with the discharge opening the old frame will be dislodged. Thereby the change can be made without materially interfering with the operation of the furnace.

Various changes in the construction and arrangement of the several parts herein shown and described may be employed without departing from the spirit of my invention as disclosed in the appended claims.

Having thus described my invention, what I claim and desire to secure by Letters Patent is:

1. In a glass feeding boot, a basin secured to the bottom of the boot and surrounding the discharge orifice, said basin being formed with a rectangular opening with flanges at opposite sides, a frame slidably fitted upon the said flanges and a bushing carried by the frame forming the discharge orifice for the basin.

2. In a glass feeding boot, a basin secured to the bottom thereof and having a rectangular opening with flanges at opposite sides thereof, said flanges being provided on their inner faces with grooves, a frame having tongues to enter said grooves for supporting the frame slidably upon the basin and a bushing removably carried by the frame and forming a discharge orifice for the basin.

HARRY RAYNES.